United States Patent [19]

Muhlberg

[11] 4,185,595

[45] Jan. 29, 1980

[54] METHOD FOR THE OPERATION OF INTERNAL COMBUSTION ENGINES

[75] Inventor: Erhard Muhlberg, Darmstadt-Eberstadt, Fed. Rep. of Germany

[73] Assignee: Siemens Aktiengesellschaft, Munich, Fed. Rep. of Germany

[21] Appl. No.: 283,412

[22] Filed: Aug. 24, 1972

[51] Int. Cl.² .............................................. F02B 43/08
[52] U.S. Cl. ..................................... 123/3; 123/25 A; 123/32 ST; 60/605
[58] Field of Search ................... 123/DIG. 12, 1 A, 3, 123/59 EC, 188 M, 32 ST, 25 A

[56] References Cited

U.S. PATENT DOCUMENTS

| | | | |
|---|---|---|---|
| 1,993,155 | 3/1935 | Faber | 123/188 M |
| 3,416,501 | 12/1968 | Castelet | 123/30 C |
| 3,513,929 | 5/1970 | Kim | 123/1 R |
| 3,635,200 | 1/1972 | Rundell et al. | 123/3 |
| 3,717,129 | 2/1973 | Fox | 123/1 A |
| 3,817,232 | 6/1974 | Nakajima et al. | 123/1 A |
| 3,828,736 | 8/1974 | Koch | 123/1 A |
| 3,855,980 | 12/1974 | Weisz et al. | 123/3 |
| 3,915,125 | 10/1975 | Henkel et al. | 123/3 |
| 3,918,412 | 11/1975 | Lindstrom | 123/3 |

Primary Examiner—Charles J. Myhre
Assistant Examiner—Craig R. Feinberg
Attorney, Agent, or Firm—Kenyon & Kenyon

[57] ABSTRACT

This is a method for the operation of internal combustion engines which is designed to decontaminate the exhaust gases. The method includes: feeding a gasification air stream into a gasification reactor; feeding fuel into the same gasification reactor; combining the fuel with the gasification air into a homogeneous fuel-air mixture in the gasification reactor; and converting the fuel-air mixture by partial combustion into a soot-free reformed gas. Then, the reformed gas is fed from the gasification reactor to a mixer where the reformed gas is mixed with combustion air and the reformed gas-air mixture is fed to the internal combustion engine for further combustion with the result that there is intensive decontamination of the exhaust gases which thereby reduces air pollution. The reformed gas temperature is adjusted low for maximum engine output, and is adjusted higher for lower engine temperatures in order to obtain a reformed gas which is richer in hydrogen and thereby produce exhaust gases which are lower in harmful substances.

In reference to the exhaust gases in an internal combustion engine, this method achieves the highest possible degree of decontamination, not only of the carbon monoxide and hydrocarbons, but also of the nitrous oxides in the exhaust gases. Using this method, the internal combustion engine can be operated not only with hightest, no-knock gasoline, but also with cheap, lead-free low octane, straight-run gasoline which is low in aromatics and olefins, which normally do not have noknock properties, and the internal combustion engine can be operated with the lowest possible fuel consumption.

The gasification reactor operates through chemical reaction in the presence of a catalyst. Optionally, this method may include a return of part of the reformed gas to the input of the gasification reactor. In order to obtain low fuel consumption, the gasification reactor is fed such a quantity of gasification air that the gasification temperature is low and the gasification is soot-free. The reformed gas from the gasification reactor is leaned-out prior to combustion in the internal combustion engine by an admixture of combustion air to such an extent that the nitrous oxide content in the exhaust gas from the internal combustion engine is considerably reduced. No evaporation of the liquid fuel takes place in the gasification reactor.

15 Claims, 9 Drawing Figures

A-A

METHOD FOR THE OPERATION OF INTERNAL COMBUSTION ENGINES

BACKGROUND OF THE INVENTION

1. Field of the Invention

This invention relates to a method for the operation of internal combustion engines, particularly externally ignited, piston type internal combustion engines. The method calls for mixture intake and gasification of the fuel outside of the internal combustion engine through partial combustion in a gasification reactor and further subsequent combustion of the reformed gas so generated in the internal combustion engine. The method is designed to achieve intensive decontamination of the exhaust gases with respect to carbon monoxide, hydrocarbons, including the carcinogenic, oxygen-containing hydrocarbon compounds such as aldehydes and organic acids, and nitrous oxides, which spread noxious odors and irritate the eyes, nose and the respirators organs. The internal-combustion engine may, for instance, be a two-cycle or four-cycle engine, with mixture intake and reciprocating or rotating pistons.

2. Description of the Prior Art

German Pat. No. 844,373 is directed to making the internal combustion engine independent of specific fuels and to having the combustion in the engine proceed as completely as possible. To this end, water vapor is added and the gasification reactor is externally heated. But, neither the method disclosed in this German patent nor that disclosed in any other known prior art achieve the objectives of this invention.

The objectives of this invention are to reduce decisively, by means of a practical, simple exothermic gasification of liquid fuels, the ever-increasing pollution, particularly of the air in the large cities, with the harmful and objectionable contents of the exhaust gases emitted by conventional internal combustion motor-vehicle engines of the Otto type. According to the method of this invention, this is done by a simple means, without resorting to an expensive endothermically operating gasification reactor which requires external heating, may raise special control problems and requires processing water. At the same time the method of this invention retains the advantages of the internal combustion gasoline engine and reduces fuel consumption as compared to internal combustion engines not using this method.

SUMMARY OF THE INVENTION

This invention is a method for the operation of internal combustion engines, such as those used in automobiles, in order to reduce the air pollution resulting from exhaust gases by mixture intake and gasification of the fuel outside of the internal combustion engine through partial combustion in a gasification reactor and further subsequent combustion of the reformed gas so generated in the internal combustion engine. This is done in order to achieve the possibility of extensively leaning-out the fuel-air mixture to be burned in the internal combustion engine and, thereby, to achieve intensive decontamination of the exhaust gases with respect to carbon monoxide, hydrocarbons, including the carcinogenic, oxygen-containing hydrocarbon compounds such as aldehydes and organic acids. It is also done to achieve a most intensive decontamination of the exhaust gas with respect to nitrous oxides.

The method calls for the following steps: feeding a gasification air stream from the engine air intake line to the gasification reactor; feeding fuel to the same gasification reactor using lead-free, relatively cheap, low octane, basic gasoline which is low in aromatics and olefins; combining the fuel with the gasification air into a homogeneous fuel-air mixture in the reactor; converting the fuel-air mixture by partial combustion into soot-free reformed gas in the gasification reator; mixing the soot-free reformed gas from the gasification reactor with combustion air; and feeding the mixture of reformed gas and combustion air to the internal combustion engine.

Gasification of the fuel in the gasification reactor takes place through chemical reaction. No evaporation of the liquid fuel takes place in the gasification reactor. Gasification takes place by catalytic means and/or by external or internal reformed gas recirculation to the input of the gasification reactor. Gasification may be carried out with or without the injection of a relatively small amount of water. The result is soot-free gasification of the initial liquid fuel, in spite of a very great air deficiency, i.e., in spite of a very low air ratio, which is equivalent to a relatively very low gasification temperature (reformed gas temperature at the output of the gasification reactor).

The method of this invention for the operation of internal combustion engines also includes the additional step of controlling, including when necessary, varying the gasification temperature as a function of the engine temperature as determined by the load on the engine, the speed of the engine and optionally by the temperature of the ambient air, or of other operating parameters, such as the exhaust gas temperature which are in unequivocal relationship therewith. In this manner, starting from a gasification temperature which is as low as possible for the highest engine temperature which corresponds to maximum engine output, the gasification temperature increases through adjustment of a larger air ratio in the gasification reactor with decreasing engine temperature, if necessary, even by tolerating a relatively small increase in fuel consumption, but with an improvement in exhaust gas decontamination. This additional step is for the purpose of improving the antiknock properties, increasing the octane rating and at the same time reducing the delivery rate impairment caused by the reformed gas, thereby improving the power yield and the utilization of the fuel in the upper load range. It is also for the purpose of improving the combustion in the engine and thereby attaining a possibility of extensive leaning out of the mixture, which decontaminates the exhaust gas and reduces the throttling losses in a medium and lower load range.

The method of this invention for the operation of internal combustion engines also includes the additional step of controlling the gasification temperature as a function of the engine temperature, or as a function of operation parameters having an unequivocal relationship with engine temperature, in the following manner. Starting from a gasification temperature as low as possible at the highest engine temperature for maximum engine output, the gasification temperature is maintained approximately down to a definite lower engine temperature which corresponds to a still relatively high engine output. The gasification temperature is kept at a relatively higher, again approximately constant value, only if the engine temperature decreases further.

The method of this invention for the operation of internal combustion engines also includes the additional step of lowering the temperature of the reformed gas more and more, prior to mixing the reformed gas with the combustion air flowing to the internal combustion engine, as a function of the engine temperature, or as a function of operating parameters which are in an unequivocal relationship with engine temperature, by means of a cooler, or by means of water injection, starting from a definite engine temperature corresponding to a relatively high engine output, as the engine temperature increases. In the alternative, the temperature of the reformed gas may be held at an approximately constant low temperature, prior to mixing the reformed gas with the combustion air flowing to the internal combustion engine, by means of a cooler or by means of water injection, starting from a definite engine temperature corresponding to a relatively high engine output, as the engine temperature increases. This additional step is for the purpose of increasing the anti-knock properties and the delivery rate and thereby the power yield and the utilization of fuel.

The method of this invention for the operation of internal combustion engines which have an exhaust gas turbo charger further includes the additional step of lowering the temperature more and more of the reformed gas-air mixture flowing to the internal combustion engine as a function of the engine temperature or of operating parameters which are in unequivocal relationship with the engine temperature, by means of a cooler or by water injection starting from a definite engine temperature which corresponds to a relatively high engine output as the engine temperature increases. In the alternative, the temperature of the reformed gas-air mixture flowing to the internal combustion engine may be kept as an approximately constant low temperature by means of a cooler or by water injection starting from a definite engine temperature which corresponds to a relatively high engine output, as the engine temperature increases.

DETAILED DESCRIPTION

Figure 1:
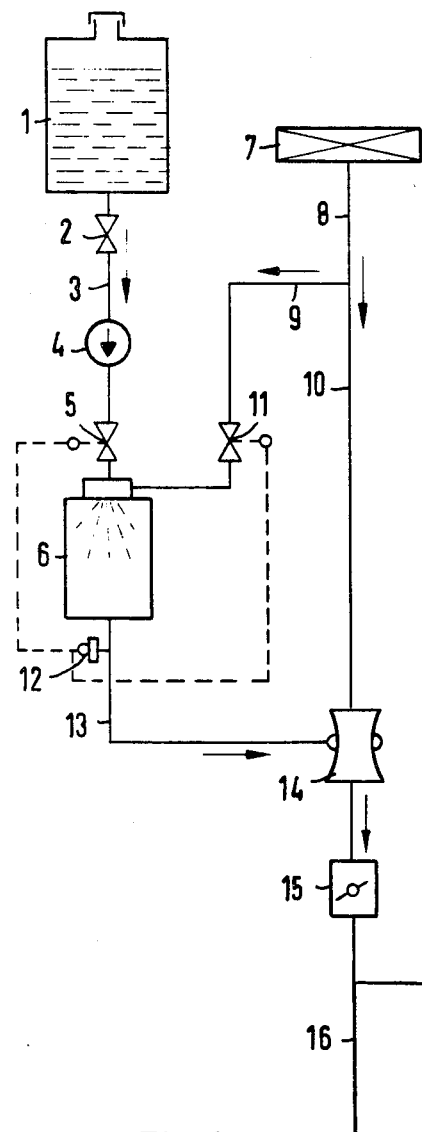
FIG. 1 is a simplified schematic illustration of a simple internal combustion engine with an installation arranged to carry out the method of this invention.

In order to achieve intensive decontamination of the exhaust gases with respect to carbon monoxide, hydrocarbons, including the carcinogenic, oxygen-containing hydrocarbon compounds such as aldehydes and organic acids, and nitrous oxides, which spread noxious odors and irritate the eyes, nose and the respirators organs, the following method of this invention has been developed. A gasification air stream is fed from the engine air intake line to the gasification reactor. Fuel is also fed to the gasification reactor, using lead-free, relatively cheap, basic gasoline, such as, straight-run gasoline, which is preferably low in aromatic compounds and olefines. The fuel is combined in the gasification rector with the gasification air into a homogeneous fuel-air mixture, converted into a soot-free reformed gas by partial combustion in the gasification reactor, the reformed gas from the gasification reactor is mixed in a mixer with combustion air from the air intake line into a reformed gas-air mixture and the reformed gas-air mixture is then fed to the internal combustion engine for further combustion. This method does not resort to a gasoline-cracking installation which is expensive, raises special control problems and also requires processing water. Yet, this method retains the advantages of a gasoline internal combustion engine.

Simultaneously with a decisive decontamination of the exhaust gases, the specific fuel consumption (g/HP hr) is reduced as far as possible, as compared to the conventional Otto engine, especially under partial-load operation which is so important for motor-vehicle engines. While maintaining the homogeneous fuel-air mixture typical of motor-vehicle engines, this method utilizes better mixture-formation and combustion conditions for a gaseous fuel. The caloric value of the mixture is decreased, the so-called leaning-out of the mixture. Aside from the economic advantage, this is in line with the conservative use of primary-energy-generating media.

In comparison with prior art standard operation with high-test gasoline, and in spite of special provisions made for homogenizing the mixture, such as evaporation of the gasoline and use of mixing floats for a particularly intimate mixture of the gasoline vapor with combustion air, the method of this invention makes it possible to achieve the following extremely important advantages as to exhaust emission in simulated city traffic: (a) reduction of the carbon monoxide emission by 98%; (b) reduction of the hydrocarbon emission by 99%; and (c) reduction of the nitrous oxide emission by 87%. The composition of the reformed gas generated as part of the method of this invention corresponds to that obtained with the known endothermic gas reforming process of one kg of hexane with 1.71 kg of water on the basis of a simultaneous equilibrium at 537.8° C. (corresponding to 1,000° F.) at 3.5 kg/cm².

At the same time, the indicated specific fuel consumption was reduced by 13%. This exceptionally large reduction in the emission of poisonous exhaust gas components is the result of a particularly extensive leaning out of the mixture, using such reformed gas as fuel. It exceeds even that which can be achieved with methane operation and has as a consequence that, with otherwise equally good reduction of the emission, the reduction of the emission of nitrous oxide is considerably larger, i.e., 87% as compared to 59%.

In the interest of high efficiency of the overall installation consisting of the internal combustion engine and the gasification reactor, it is advantageous to use fuels with a low boiling point and a low octane number, such as so-called "straight-run gasoline", also called basic gasoline. This type of fuel can be gasified with a relatively large air deficiency and at a correspondingly low reaction temperature without the formation of soot, so that the losses which are caused by the heat of the reformed gas leaving the gasification reactor, which cannot be utilized in the engine connected to it, can be kept low.

By externally or internally recirculating an adjusted partial quantity of the reformed gas generated from the output of the gasification reactor to the input of the gasification reactor, one can further lower the reaction temperature required for soot-free gasification.

On the basis of known research results, the permissible gasification temperature can be reduced further by the addition of water into the gasification reactor or into the line for the external reformed gas recirculation, for instance, to 600° C. in the case of a gasoline distillate which corresponds to an air ratio of only $\lambda = 0.18$. As compared to endothermic gas reforming, the amount of water required per kg of gasoline used is substantially smaller, for example, only 0.2 kg of water per kg of gasoline. With a higher boiling level (mean boiling temperature) of the fuel to be gasified, the lowest permissible gasification temperature becomes higher. For commercial Diesel fuel, for instance, it is 750° C., corresponding to an air ratio of approximately $\lambda = 0.25$ and a water addition of approximately 0.4 kg per kg of Diesel fuel.

It is also known in another context, namely, in a gasoline gasification reactor for alkaline low-temperature fuel cells, to lower the air ratio, and thereby the gasification temperature, to an unusual degree by carrying out the gasification of the straight-run gasoline used, which takes place through partial combustion, in the presence of a very selective (with respect to the gasification reactions), highly active catalyst which is applied in a suitable manner to a ceramic-like, suitably arranged carrier substance. This type of gasification through chemical reaction in the presence of a catalyst is particularly well suited for the method according to this invention. Due to the particularly low exothermicity, the thermodynamic disadvantage of releasing fuel heat at the incorrect time is at least considerably reduced. Another advantage is that the combustion is better, as compared to normal gasoline operation, and this advantage manifests itself in an increase of the efficiency factor $\eta\, g$ of the combustion.

Except for the top output range, particularly the lower gas change losses have a thermodynamically favorable effect as a result of the quality control which is possible with gas operation to a large degree. As is well known, these losses become larger and larger in the conventional Otto engine with decreasing load and increasing speed due the quantity control required (throttle control) and manifest themselves by a very unfavorable fuel consumption at partial load. For these reasons, these advantages predominate over a wide range of operating conditions. Overall, there is an appreciable saving in fuel consumption. This will be even more true, as the output rating of an engine becomes higher in comparison to the weight of the motor vehicle driven by it, a trend observed increasingly in passenger vehicles, except in the United States of America where the engines are already very powerful. Such high-powered vehicles must be operated at lower and lower partial loads, i.e., they must be throttled more, because of the speed reduction which is either the result of regulations or of the increasing traffic density.

It may be possible that the thermodynamic loss caused by the tangible heat of the reformed gas generated by partial combustion cannot be fully compensated at the upper output range because of smaller advantages in regard to the gas-change energy, if the engine power is kept so low that it is utilized fully, instead of being utilized only occasionally for accelerating and full-speed highway driving. With such engines, which are small relative to the weight of the vehicle, there is a further detrimental effect attending the proposed method of a reduction in the delivery rate, which is caused by the addition of reformed gas into the intake system and which reduces the maximum engine output correspondingly. However, it should be strongly emphasized at this point that this disadvantage naturally has no bearing on engines which are so powerful that they practically cannot be operated at full load, which incidentally also benefits their useful life. On the contrary, one even obtains the advantage that the power limit which when not reached necessitates a change from quality control to the gas-change energy-increasing quantity (throttle) control in order to assure still sufficiently rapid combustion, can be shifted further toward lower values due to the addition of hot reformed gas into the intake air, which increases the temperature level of the combustion.

From the preceding discussion, the initial conclusion follows that the method according to the invention is particularly well suited for motor vehicles with sufficiently powerful engines.

However, in order to make it applicable also for motor vehicles with medium-powered engines and, particularly, also for relatively low-powered engines without impairment of the maximum output attainable with normal gasoline operation, the power deficiency can at least be compensated for by an exhaust-gas turbo charger. In order to make up for the additional expense of an exhaust gas turbo charger, the maximum output can be increased over normal gasoline operation, depending on the limits given by the mechanical and thermal load capacity of the engine, taking into consideration an acceptable service life of the engine. In comparison with normal operation using more or less highly leaded gasoline, the method according to the invention has the further advantage, due to the use of lead-free fuels, that troublesome lead deposits are completely eliminated not only in the engine combustion chamber, but also at the blades of the turbine of the exhaust-gas turbo charger, where, as is well known, they can lead to a reduction of the turbine efficiency.

Due to the particularly clean gas combustion, other deposits in the engine and the turbine stemming from the fuel are also minimized by use of the gasification operation of this invention. This also reduces the wear on the engine extraordinarily and considerably extends the life of the motor oil, especially due to the much-reduced formation of nitrous oxide and the correspondingly less acidification of the oil by nitric acid formed from the nitrous oxides.

Added to this is the further advantage of operation with reformed gas generated from liquid fuel, that due to the gaseous nature of the fuel and the more complete combustion resulting therefrom, the formation of organic acids, such as formic and acetic acid, can practically be prevented. This not only retards the acidification of the oil, but also increases the life of the exhaust system and, furthermore, reduces the irritating effect of the exhaust on the nose and the eyes, and the odorous annoyance resulting from the exhaust gases. The same applies to the aldehydes and the harmful effects on the nose and the eyes caused thereby as well as on the respiratory organs. The aldehydes, such as formaldehyde and acrolein, are typical products of arrested combustion reactions, the formation of which can be reliably inhibited with gas operation. This not only applies when the engine is fully warmed up but also during the warm-up period. The same advantage can be expected with reformed gas operation with respect to the emission of exhaust gas components which may have a carcinogenic effect, such as, for instance, the infamous 3,4-benzpyrene. This polycyclic hydrocarbon is emitted in conventional Otto engines, according to the most recent investigations, and contrary to previous measurements, over the entire range of operation and, at that, in a quantity which is very substantially greater than that which it has been possible to detect so far.

The emission of this insidious exhaust gas component is prevented from the start because of the proven relation between the content of aromatic compounds in the liquid fuel and the 3,4-benzpyrene content in the exhaust gas of Otto engines. At worst, only an insignificant emission of this harmful substance is to be expected with the method of this invention, because this method starts out with liquid fuels which are practically free of, or in any event low in, aromatic compounds, as compared to regular and high-test gasoline.

Finally, the method of this invention permits the use of lead-free gasolines. This completely eliminates the emission of lead, which according to authoritative scientists may lead to long-term damage even at low concentrations in the air.

According to a further embodiment of the method according to this invention, the temperature of the reformed gas leaving the gasification reactor (gasification reaction temperature) and, thereby, the ratio of the amounts of gasification air to the fuel used is not regulated to a constant value. It is varied depending upon the load on the engine and power of the engine, and optionally on the condition of the ambient air, by means of known control devices in such a manner that with decreasing engine output (product of load and speed) and/or ambient temperature, a higher gasification reaction temperature is obtained, and, as a result thereof, a reaction gas (reformed gas) richer in hydrogen concentration is obtained. With increasing engine output and/or ambient temperature, on the other hand, a lower reaction gasification temperature is obtained, and as a result thereof, a reaction gas (reformed gas) richer in methane is obtained, with better antiknock properties, or a higher "performance number", which counteracts the tendency of an Otto motor to knock with increasing power output. With the foregoing measures, the control range of the gasification reaction temperature is still in the range of relatively very low temperatures, for instance, 400°–600° C.

This method is not limited to reciprocating engines operating in a four-cycle or two-cycle mode, but can be used also with rotary-piston engines with external ignition. In both types of piston engines, external ignition is understood to include not only the conventional, time-controlled ignition, but also those methods of external ignition which produce the ignition by the injection of ignition oil, by catalytic means or by localized hot spots, such as, for example, rod-shaped heater plugs.

In connection with measures to increase the output under the method of this invention by the simple addition of reformed gas generated from liquid fuels into the intake pipe of the engine, it is further proposed, particularly for low-power engines, to cool the hot reformed gas. Cooling the reformed gas may be found necessary also in cases where there is danger that the hot reformed gas might ignite when mixed with the intake air, which must, of course, be prevented under any circumstances.

This can be accomplished either indirectly by means of a gas cooler acted upon by cooling air or a liquid coolant, or directly by means of suitable water injection into the hot reformed gas behind the gasification reactor. In the latter case, a further reduction of the nitrous oxide formation going beyond that produced by the cooling of the reformed gas is achieved in reference to this poisonous exhaust gas component, especially due to the ballast effect of the water vapor generated, which takes place during the combustion in the engine.

For the reason alone of keeping the water consumption within limits, the water injection is to take place only in the top load range, where the reduction in the delivery rate due to hot reformed gas is detrimental and the formation of nitrous oxide is greater, and is to be reduced more and more with decreasing engine temperature (and therefore, with decreasing load).

For the most far-reaching application of quality control possible, it is also advantageous to control the indirect cooling of the reformed gas by using known control devices, as well as the water injection. For the case of an installation according to the method of this invention which is as simple as possible, indirect cooling of the generated reformed gas may be provided over the entire range of operation of the generated fuel gas by means of external fins on the reformed gas-carrying lines of the intake system.

In the case of a charged engine with a charging-air cooler already provided for the purpose of thermal and mechanical relief, the latter can be utilized for the indirect cooling of the reformed gas by a corresponding enlargement of the heat exchange surfaces and/or an increase of the coolant flow, if the reformed gas is introduced by means of a gas mixer into the pressure line of the exhaust turbo charger which carries the combustion air of the engine, ahead of its entry into the charging-air cooler.

In a further embodiment of the invention, a stratification of the charge in the central region of the combustion space within each cylinder of the engine can be achieved and, in connection therewith, a possibility of extensively leaning-out the mixture, as well as an improvement of the antiknock properties of the engine, may be achieved. For this purpose, arrangements such as the following are suitable: four-cycle engines, valves with deflectors, inlet canals opening tangentially into the cylinder, or swirl canals in order to produce a suitable rotation of the cylinder charge about the axis of the cylinder.

In order to increase the angular velocity of the cylinder charge and therefore achieve a better accumulation of the reformed gas in the center of the combustion chamber, a combustion space may be used which is essentially of rotational symmetry situated in the area of the cylinder axis. The cylinder charge rotates as if it were a solid body and consists of air and reformed gas as well as possibly residual gases. The maximum diameter of the combustion space to be used is more or less smaller than the cylinder diameter, depending upon the requirements of the intensity of the charge stratification required and the combustion. The combustion space is arranged in the piston as well as in the cylinder head and the spark plug is in the region of the center of the combustion space.

In the case of a free-intake internal combustion engine, the gasification air can be branched off from the air flowing to the internal combustion engine behind a common air filter for the engine combustion air. In the case of the charged combustion engine, however, the gasification air is taken from the air supply system of the engine behind the charger.

In the case of the free-suction engine the reformed gas generated in the gasification reactor is introduced ahead of the throttle in the main line of the intake system, which becomes effective only if the limit of an advantageous leaning out of the mixture is reached, i.e., in the lower to medium load range.

In the case of the charged engine with a throttle situated behind the charger, the reformed gas is also introduced ahead of the throttle, for reasons of simplification of the control system, and the same explanation regarding the throttle applies here as for the free-suction engine.

To the extent that alternative, normal operation with a suitable light fuel is desired, this can be realized in the simplest manner by introducing this fuel into the gasification reactor via a nozzle, but not igniting it. In order to assure engine operation without ignition failure and otherwise without trouble, one must change over to the throttle (quantity) control necessary with the conventional Otto engine for controlling the power output. The quantity of fuel injected per unit time depends principally on the air input, but other operational parameters must also be taken into consideration, as in the case of the gasoline injection engine. The change-over to normal operation with a suitable light fuel can be achieved also by installing a carburator in the intake line proper of the engine, or by providing a standard injection device with suction-tube injection, which can be put in operation by a fuel change-over device.

The control of and the ratio of the quantity of gasification air to be supplied to the gasification reactor to the quantity of liquid fuel to be gasified has a strong influence on the reformed gas composition and the reformed gas temperature. The control of the quantity of gasification air to be supplied to the gasification reactor and the quantity of liquid fuel to be gasified should be such that, in the simplest case, for any input of gasification air and fuel used, the reformed gas temperature is essentially kept at a constant value over the entire operating range. The control of the reformed gas temperature should be such as to produce the following results: (1) no soot formation; (2) avoidance of knocking during combustion for a given Otto engine; and (3) the greatest possible reduction in the emission of harmful exhaust gas components, ascertained, for instance, by the "California test" or the "Europa test". One must also give attention to achieving a favorable fuel yield (effective specific consumption) and a favorable engine output (maximum engine output, effective full-load average pressure).

This control method can be realized, for instance, by providing that the members controlling the fuel and gasification air input are appropriately adjusted by means of a thermostat arranged at the output of the gasification reactor, the temperature sensor of which is surrounded by the generated reformed gas, with the aid of amplifying devices, if necessary.

In the case of variable gasification temperature, which is more expensive, but engine-wise more favorable, a thermostat must be used whose setpoint is adjustable, for instance, as a function of the engine temperature.

Example of Installation

The following two installations will be explained, by way of illustration, to show the many variants of piston combustion engines which can be considered for carrying out the method of this invention.

FIG. 1 is a simplified schematic illustration of a simple internal combustion engine arrangement. Referring to FIG. 1, the liquid fuel to be gasified flows from the fuel supply tank 1, through the open fuel valve 2 and the fuel line 3 to the fuel pump 4. The fuel pump 4 delivers the fuel at a pressure sufficient for proper vaporation through fuel rate control valve 5 and a vaporization device, not shown, to a thermally insulated gasification reactor 6 which achieves partial combustion (internal heating) in an appropriately apportioned quantity. The total air stream which is drawn in by the piston combustion engine 16 and the gasification reactor 6 is cleaned in the air filter 7 and then is conducted through air line 8. The flow of gasification air for gasification reactor 6 is branched off from the total air stream through gasification air line 9. Gasification air flow-rate control valve 11 controls the flow of gasification air and delivers an appropriately apportioned quantity of gasification air to the gasification reactor 6.

In the embodiment illustrated in FIG. 1, the control of the quantity of liquid fuel and the control of the quantity of gasification air reaching the gasification reactor 6 is accomplished by means of a sensor 12. Sensor 12 functions as a pulse transmitter for the reformed gas temperature at the output of the gasification reactor 6 by means of known control loop components, not shown in FIG. 1. Sensor 12 maintains a suitable, constant gasification temperature of the reformed gas over the entire operating range of the engine.

The gasification air is delivered to the gasification reactor 6 as a result of the fact that a sufficiently strong underpressure is generated in the gasification reactor 6 relative to air line 8 by connecting the reformed gas line 13 originating at the gasification reactor 6 to the narrowest cross section of the reformed gas-air mixer 14, which is designed as a Venturi tube.

To the extent that in the event of load reduction, operation which is no longer favorable, from the point of view of combustion and consumption, cannot be achieved with low throttle loss by leaning out the homogeneous reformed gas-air mixture generated in the reformed gas-air mixer 14, the reformed gas-air mixture output is reduced by operating the throttle 15. The fuel gas-air mixer 14 is a quality control. The reformed gas-air mixer 14 may be a Venturi tube arranged in the air feed line of the internal combustion engine. Mixer 14 processes the reformed gas and the combustion air into an appropriately leaned-out reformed gas-air mixture. The throttle is a combined quality and quantity control. The exhaust gases of the combustion engine 16, whose output shaft is designated as 17, are conducted away through the exhaust line 18.

The method of operation illustrated in FIG. 1 should be considered pertinent to both the externally ignited Otto engines which draw in a mixture and the so-called Diesel gas engines which also draw in a fuel gas-air mixture. However, in contrast to the Otto gas engine, the ignition of the mixture in the Diesel engine is brought about by properly timed injection of a suitable quantity of ignition oil into the engine cylinder.

It is within the scope of this invention that a combustion engine may be modified for carrying out the method of this invention in an alternating manner or even in parallel with the normal operation of an Otto engine having a gasoline carburator or gasoline injector, or with the normal operation of a Diesel gas engine.

Figure 1A:
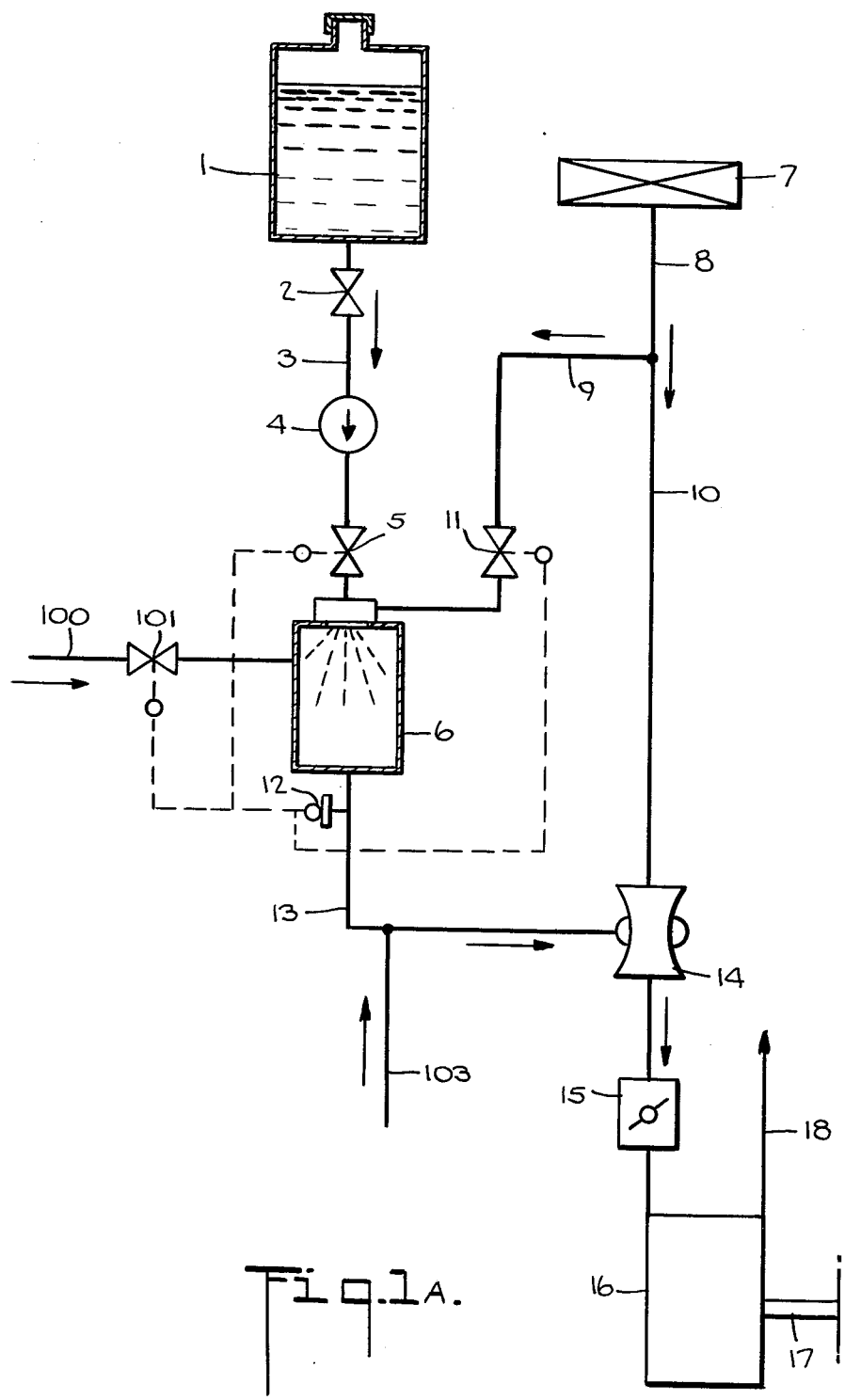
FIG. 1a illustrates the introduction of water into the gasification reactor and inserting of water into the fuel gas.

FIG. 1a illustrates the introduction of water into the gasification reactor 6, through a line 100 in which there is inserted a valve 101 controlled by the sensor 12. It also illustrates the possibility of introducing water into the line 13 containing the fuel gas using a line 103.

Figure 1B:
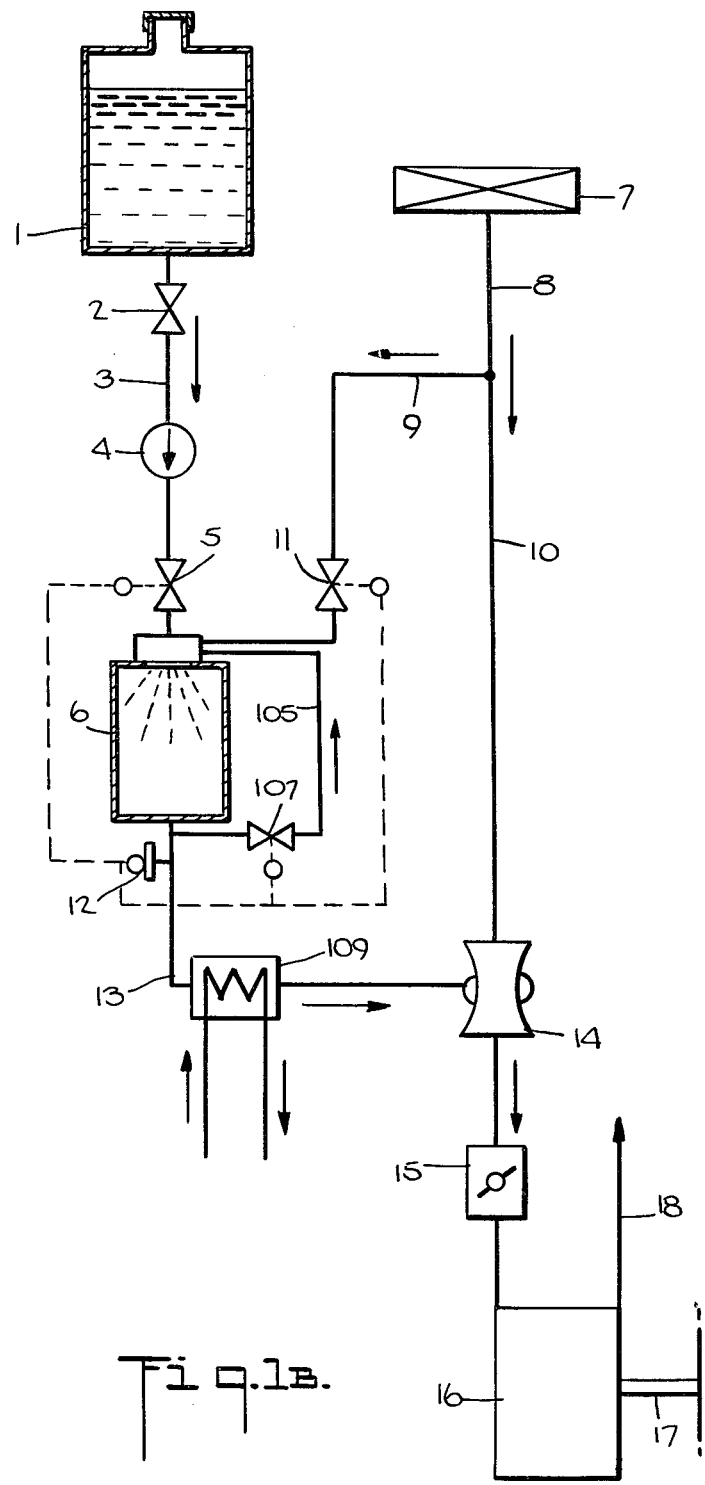
FIG. 1b illustrates returning a part of the fuel gas formed in the gasification reactor from its output to its input and the cooling of the fuel gas formed in the gasification reactor using a heat exchanger.

FIG. 1b illustrates returning a portion of the fuel gas formed in the gasification reactor 6 from its outlet to its inlet over a line 105 in which there is intalled a valve 107, valve 107 also being controlled by the sensor 12. This Figure also illustrates cooling of the fuel gas in line 13 by the interposition of a heat exchanger 109.

Figure 1C:
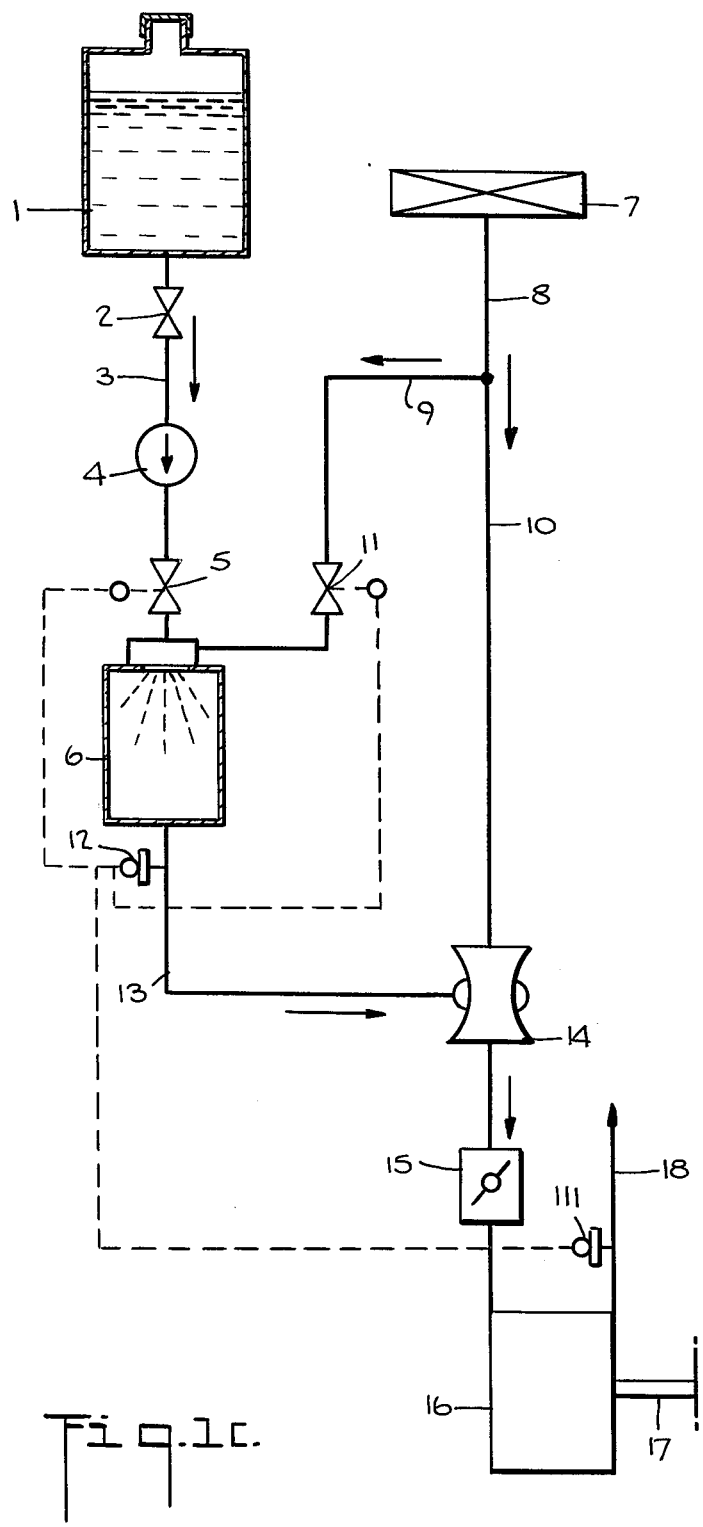
FIG. 1c illustrates measurement of the temperature of the exhaust gas at the outlet of the engine for regulation of the gasification temperature.

FIG. 1c illustrates measurement of the temperature of the exhaust gas at the outlet of the engine 16 by means of a sensor 111, the sensor 111 output then being used to regulate the temperature in the gasification reactor along with the output from the sensor 12.

Figure 2:
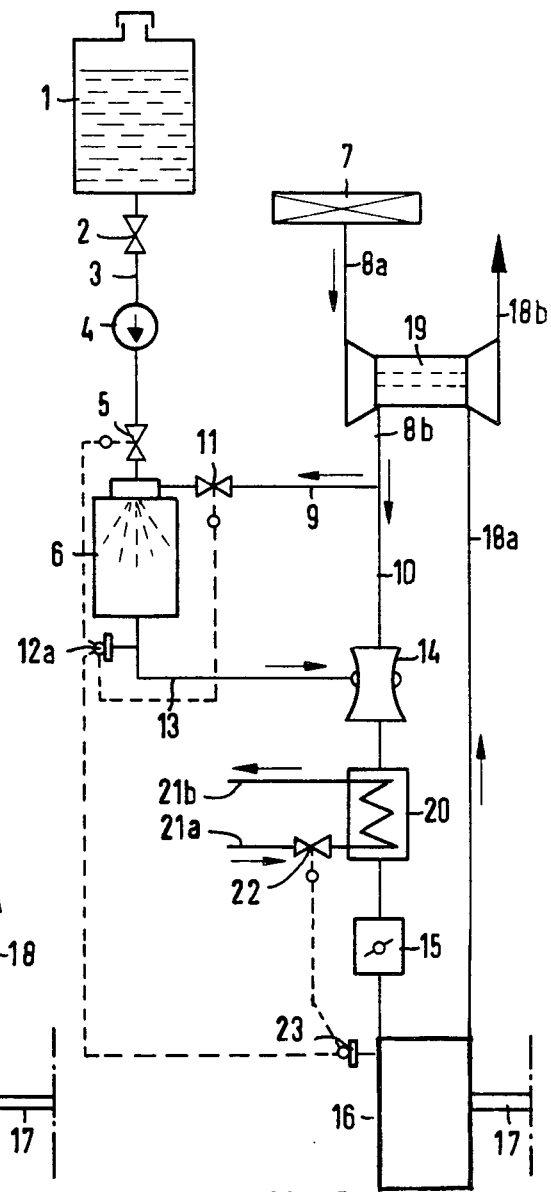
FIG. 2 is a simplified schematic illustration of a more complex internal combustion engine with an installation arranged to carry out the method of this invention.

FIG. 2 illustrates in schematic form a more complex internal combustion engine system for carrying out the method of this invention. Referring to FIG. 2, this is a combustion engine with mixture compression whose power is increased by an exhaust gas turbo charger 19. In the exhaust gas turbo charger 19 the gasification reactor temperature and the temperature of the fuel gas-air mixture after the charger are controlled. They are controlled, on the one hand, in the top load range for the purpose of favorably influencing the attainable maximum output and the specific fuel consumption. They are controlled, on the other hand, in the medium and lower load ranges for the purposes of improving the combustion in the engine and thereby, particularly, improving the possibility of leaning out the mixture, which decontaminates the exhaust gas and reduces the throttle losses. In this manner, with the engine temperature decreasing due to decreasing load and/or speed and/or ambient air temperature, the gasification reactor temperature (reformed gas temperature) and the temperature of the reformed gas-air mixture increase prior to entering the combustion engine 16 and vice versa.

Those parts of the installation illustrated in FIG. 2 which are also contained in the simple system illustrated in FIG. 1 have the same reference numerals as used in FIG. 1.

The exhaust gas turbo charger 19 consists of the centrifugal compressor V and the turbine T driving it, which is acted upon by the exhaust gases conducted to it through line 18a.

The sensor 23 detects the engine temperature and influences the desired value of the reformed gas temperature to be controlled by the reformed gas temperature control 12a, as previously explained for the simple system of FIG. 1. The flow control valves for the gasification air 11 and for the liquid fuel 5 are adjusted accordingly.

The cooler 20 cools the reformed gas-air mixture generated in the fuel gas-air mixer 14. The cooling effect of cooler 20 is reduced with decreasing engine temperature as explained previously with the aid of the engine temperature sensor 23 by means of a corresponding adjustment of the coolant flow control valve 22 in the coolant input 21a (or also in the coolant outlet 21b).

The gasification air is branched off from the charger air pressure line 8b and is fed to the gasification reactor 6 through the gasification air line 9 under the action of the pressure drop built up by the fuel gas-air mixer 14, wherein the quantitatively correct apportioning is assigned to the gasification air flow control valve 11.

Figure 3:
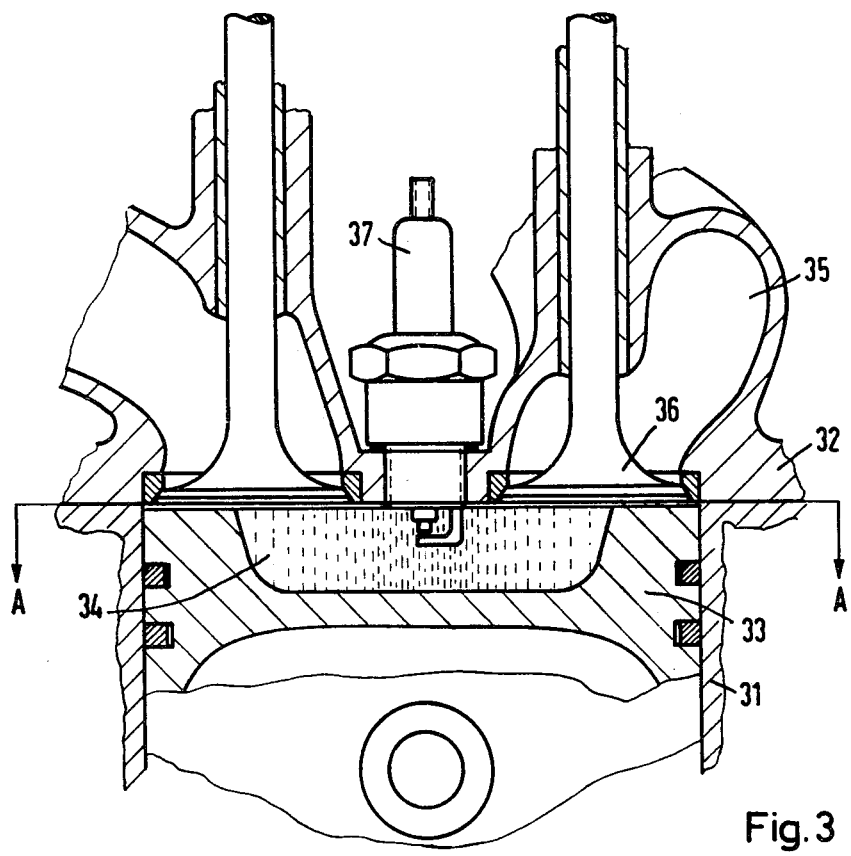
FIG. 3 is a longitudinal cross section of a cylinder in a four-cycle engine in which each cylinder has an intake swirl canal and in which a charge stratification is achieved.
Figure 4:
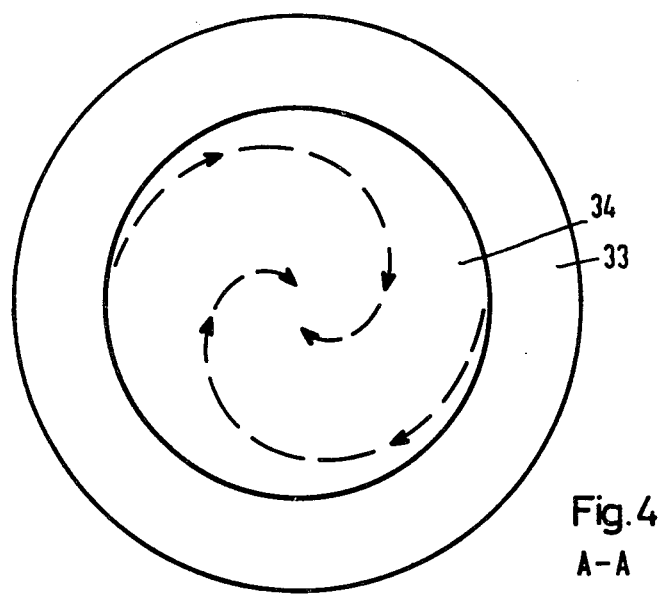
FIG. 4 is a top view of the cylinder of FIG. 3 in the plane A—A of FIG. 3.
Figure 6:
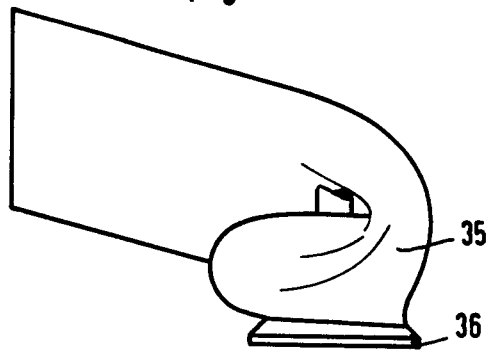
FIG. 6 is a side elevation view of the swirl canal shown in FIG. 5.
Figure 5:
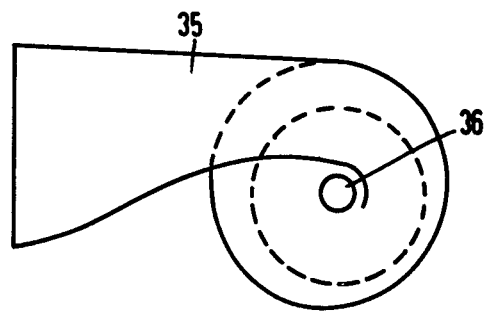
FIG. 5 is a top view of the swirl canal at the cylinder head shown in FIG. 3.

FIGS. 3–5 show a four-cycle engine cylinder with a cylinder head which has an intake swirl canal and in which a charge stratification is achieved in a favorable manner at the center of the combustion space of the cylinder. FIG. 3 is a longitudinal cross section through the cylinder 31, showing a cylinder head 32. FIG. 4 is a top view of the piston 33 in the cylinder 31 in the plane A—A of FIG. 3. FIG. 5 shows a top view of the swirl canal 35 at the cylinder head 32. FIG. 6 shows a side elevation view of the swirl canal 35 at the cylinder head 32.

The piston 33 which has a combustion space 34 opposite the spark plug 37 located in the cylinder axis, is at top dead center. Through the inlet swirl canal 35 a rotation of the cylinder charge about the cylinder axis, and thereby about the axis of the piston combustion space 34 is generated during the suction stroke of the piston 33, i.e., while the inlet valve 36 is open. A charge stratification in the central region of the combustion space 34 is thereby produced, i.e., the reformed gas concentration of the reformed gas-air mixture is higher in this central region than the reformed gas concentration in regions that are situated further out radially. This is indicated in FIG. 3 by the more closely spaced shading lines in the combustion space 34. This stratification results because the reformed gas molecules which are lighter in comparison with the air molecules, and therefore are subject to a smaller centrifugal effect, travel on spiral-shaped paths toward the cylinder axis, due to the pressure gradient in the vortex formed in the cylinder 31.

Accordingly, the spark plug 37 is arranged in the center of the cylinder head 32, and therefore on the cylinder axis. For improving the initiation of the ignition and therefore, of the combustion, both of its electrodes protrude slightly into the combustion space 34 whereby a favorable leaning-out limit is obtained.

What is claimed is:

1. In a method for the operation of internal combustion engines with reduced emission of harmful substances in the exhaust gas, wherein liquid fuel and gasification air are conducted into a gasification reactor at a low air/fuel ratio and mixed, the mixture converted into soot-free fuel gas by partial oxidation of the fuel at increased gasification temperature, the fuel gas leaned out with combustion air, so that the fuel gas and combustion air can be burned in such a manner as to produce an exhaust gas low in harmful substances, and the the mixture of fuel gas and combustion air with which it has been leaned out then burned in an internal combustion engine, the improvement comprising regulating the gasification temperature in dependence on the load and the speed of the internal combustion engine in such a way, that a low gasification temperature is maintained at full load and is increased at decreasing load.

2. The method according to claim 1 and further including generating a stratification charge at the center of the combustion space of each cylinder of the engine and igniting said charge by spark a plug arranged in the center of each cylinder head.

3. The method according to claim 1 wherein said step of regulating comprises controlling inputs to the gasification reactor to maintain the desired gasification temperature.

4. The method according to claim 3 comprising regulating a low gasification temperature by lowering the ratio of gasification air to fuel.

5. The method according to claim 3 comprising regulating a low gasification temperature by conducting water into the gasification reactor.

6. The method according to claim 3 comprising regulating a low reaction temperature by returning a part of the fuel gas formed in the gasification reactor from its output to its input.

7. The method according to claim 3 and further including concentrating the combustion air by means of an exhaust gas operated turbo charger.

8. The method according to claim 3 comprising using the temperature of the engine as a measure for the load of the engine and regulating the gasification temperature in dependence on the engine temperature.

9. The method according to claim 8 comprising measuring the temperature of the exhaust gas at the outlet of the engine for use as the engine temperature.

10. The method according to claim 8 comprising maintaining the gasification temperature at a constant low value during high engine temperature and increasing gasification temperature as soon as the engine temperature sinks below a predetermined value.

11. The method according to claim 8 comprising maintaining the gasification temperature at a constant low value during high engine temperature and at a higher value as soon as the engine temperature sinks below a predetermined value.

12. The method according to claim 3 and further including cooling the fuel gas formed in the gasification reactor before leaning out with combustion air.

13. The method according to claim 12 wherein said cooling is carried out by a heat exchanger.

14. The method according to claim 12 wherein said cooling is carried by by injection of water into the fuel gas.

15. The method according to claim 12 wherein the fuel gas is cooled only if the engine temperature exceeds a predetermined temperature.

* * * * *